United States Patent [19]

Corwon et al.

[11] Patent Number: 5,209,524
[45] Date of Patent: May 11, 1993

[54] PIPE RESTRAINING COLLAR MEMBER HAVING PROTRUSIONS OF DIFFERENT SIZES

[75] Inventors: Michael E. Corwon, Texarkana, Tex.; Edwin A. Bird, Ashdown, Ark.; Kirby L. Shaddix, Texarkana, Tex.

[73] Assignee: M&FC Holding Company, Inc., Wilmington, Del.

[21] Appl. No.: 788,455

[22] Filed: Nov. 6, 1991

[51] Int. Cl.$^5$ ............................................. F16L 13/04
[52] U.S. Cl. ............................ 285/114; 285/259; 285/415; 285/368
[58] Field of Search ................ 285/328, 414, 415, 420, 285/114, 368, 259, 238

[56] References Cited

U.S. PATENT DOCUMENTS

| 640,183 | 1/1890 | Dresser | 285/415 |
|---|---|---|---|
| 659,888 | 10/1900 | Dresser | 285/368 |
| 2,371,971 | 3/1945 | Main et al. | 285/259 |
| 3,249,371 | 5/1966 | Peterman | 285/259 |
| 3,252,192 | 5/1966 | Smith | 24/81 |
| 3,432,190 | 3/1969 | Kunz | 285/259 |
| 3,817,561 | 6/1974 | Kay | 285/259 |
| 4,111,469 | 9/1978 | Kavick | 285/259 |
| 4,150,848 | 4/1979 | Dyrup | 285/238 |
| 4,372,587 | 2/1983 | Roche | 285/238 |
| 4,522,434 | 6/1985 | Webb | 285/368 |
| 4,568,112 | 2/1986 | Bradley et al. | 285/238 |
| 4,635,970 | 1/1987 | Haines | 285/415 |
| 4,820,194 | 6/1989 | Berry | 285/420 |
| 5,090,742 | 2/1992 | Cohen et al. | 285/114 |

FOREIGN PATENT DOCUMENTS

| 58318 | 1/1975 | Australia | 285/414 |
|---|---|---|---|
| 2900678 | 7/1980 | Fed. Rep. of Germany | 285/328 |
| 1420486 | 11/1965 | France | 285/368 |
| 2242630 | 3/1975 | France | 285/414 |

Primary Examiner—Eric K. Nicholson
Attorney, Agent, or Firm—Lorusso & Loud

[57] ABSTRACT

A pipe coupling member comprising a collar member, flanges disposed on the collar member for connecting the collar member a support member, the collar member and the support member being adapted cooperatively to substantially encircle a first pipe member, lugs disposed on the collar member for connecting the collar member to a collar assembly substantially encircling a second pipe member, and elongated protrusions extending inwardly from an inside surface of the collar member and adapted to engage an external surface of the first pipe member.

14 Claims, 6 Drawing Sheets

5,209,524

PIPE RESTRAINING COLLAR MEMBER HAVING PROTRUSIONS OF DIFFERENT SIZES

BACKGROUND OF THE INVENTION

1. Field of the Invention

This invention relates to pipe restraining members and is directed more particularly to a collar member comprising at least one part of a pipe restraining assembly.

2. Description of the Prior Art

The provision of restraining assemblies suitable for holding adjacent ends of pipes in a fixed position relative to each other is well known.

In U.S. Pat. No. 3,252,192, issued May 24, 1966, in the name of Joseph B. Smith, there is disclosed a pipe restraining assembly including two collar assemblies, one of which is installed proximate an end of one of the pipes. Each collar assembly includes two collar members which are provided with flanges adapted to be bolted together to form a pipe-encircling collar assembly. Each of the two collar assemblies is provided with lugs which receive tie bolts to connect the collar assemblies to each other. Internally of the collar members are gripping surfaces adapted to engage the external surfaces of the pipes. To enhance pipe-gripping capability, the collar member gripping surfaces of Smith are provided with a layer of particles which are adapted to embed in the external surfaces of the pipes.

Examples of other restraining assemblies having collar members with gripping surfaces include U.S. Pat. No. 4,372,587, issued Feb. 8, 1983, in the name of Charles W. Roche, and U.S. Pat. No. 4,568,112, issued Feb. 4, 1986, in the name of Earl C. Bradley et al., in which serrations are used to engage and grip the pipe members.

It is common practice in the pipe restrainer industry to dimension the internal radius of collar members substantially equal to the external radius of the pipe to which the collar members are to be applied. When protrusions are placed on the internal surface of the collar member, such protrusions extend inwardly of the internal radius of the collar member and therefore inwardly of the outside radius of the pipe. Such practice has been believed to insure intimate contact between the collar member internally extending protrusions and the pipe exterior. However, it has been determined that when a collar member is so configured, installation often results in the protrusions nearest the flange portions at the ends of the collar member being forced over the pipe, with the protrusions scraping along and biting into the exterior of the pipe until they come to their final position. Inasmuch as the collar member usually is formed of a relatively massive and unyielding band of metal, to insure longevity in service, the collar member has little resiliency to aid in installation, that is, in slipping over the pipe when there are interfering internal projections on the collar member.

Accordingly, it has been found that in the use of protrusions, including teeth, prongs, or the like, the protrusions nearest the ends of the collar member generally bite substantially deeper into the pipe than do the protrusions at or near the center of the collar member inside surface arc. In extreme instances, the end protrusions have been found to bite deeply into the pipe, while the center protrusions fail to touch the pipe. It therefore would be beneficial if restraining collar members having protrusions on their gripping surfaces were configured and dimensioned such that contact and engagement with the pipe restrained thereby were more nearly uniform.

SUMMARY OF THE INVENTION

It is, therefore, an object of the invention to provide a restraining collar member having protrusions extending internally thereof, the collar member and the protrusions being configured, dimensioned and arranged so as to engage a pipe substantially uniformly.

With the above and other objects in view, as will hereinafter appear, a feature of the present invention is the provision of a pipe restraining member comprising a collar member, flange means disposed on the collar member and adapted to receive first connection means for connecting the collar member to support means, the collar member and the support means being adapted cooperatively to substantially encircle a first pipe member, lug means disposed on the collar member and adapted to receive second connecting means for connecting the collar member to a collar assembly substantially encircling a second pipe member, and elongated protrusions extending inwardly from an inside surface of the collar member and adapted to engage an external surface of the first pipe member.

In accordance with a further feature of the invention, the collar member is provided with an inside radius, measured at the free ends of the protrusions, equal to, or greater than, the outside radius of the pipe to which the collar member is to be attached.

In accordance with a still further feature of the invention, in the pipe restraining member described above, the collar member comprises a band portion having the aforementioned protrusions extending from the inside surface thereof, and a reinforcing rib portion extending from an outside surface of the band portion centrally along the length of the band portion and generally normal to the outside surface of the band portion, the band portion and rib portion being so configured as to provide required strength in the collar member, but in addition thereto, a degree of resiliency to aid in initial installation of the collar member.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 8:
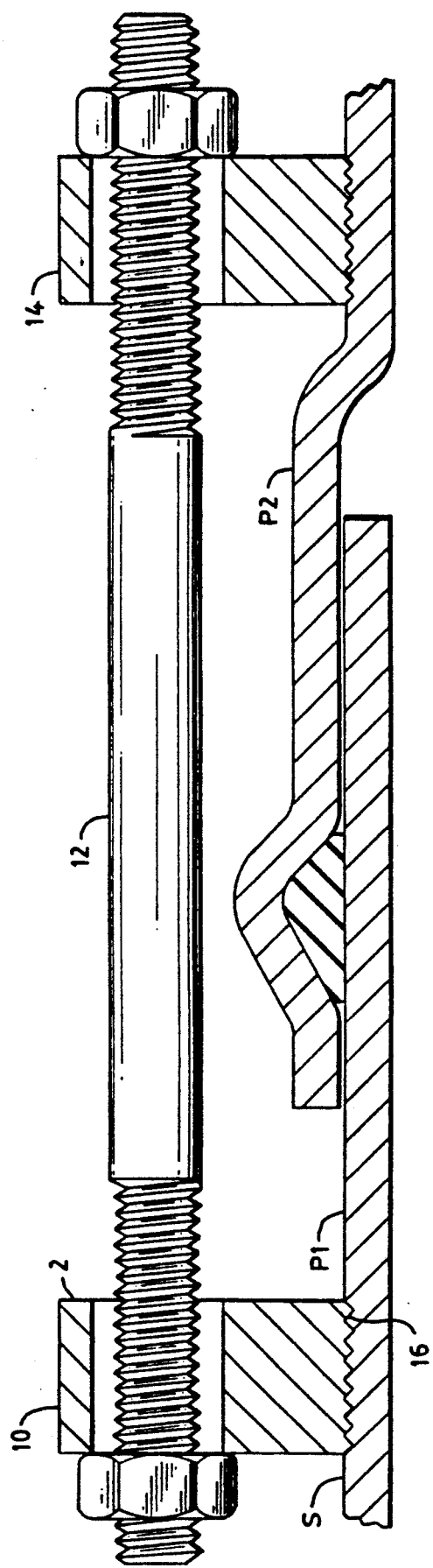
FIG. 8 is a generally centerline sectional view of a pipe restraining assembly of the type in which the above pipe restraining collar members find utility.

Referring to FIGS. 1-5, it will be seen that a restraining member illustrative of the present invention comprises a collar member 2 having flange means thereon, including first and second flanges 4, 4' adapted to receive first connecting means, such as bolts 6, for connecting the collar member 2 to support means 8 (FIG. 1), which may be one or more collar members similar to the collar member 2. The collar member 2 and the support means 8 are adapted cooperatively to substantially encircle a first pipe member P1 (FIG. 8). The collar member 2 is provided with one or more lugs 10 adapted to receive second connecting means, such as tie bolts 12, for connecting the collar member 2 to a collar assembly 14 (FIG. 8) encircling a second pipe P2.

Figure 1:
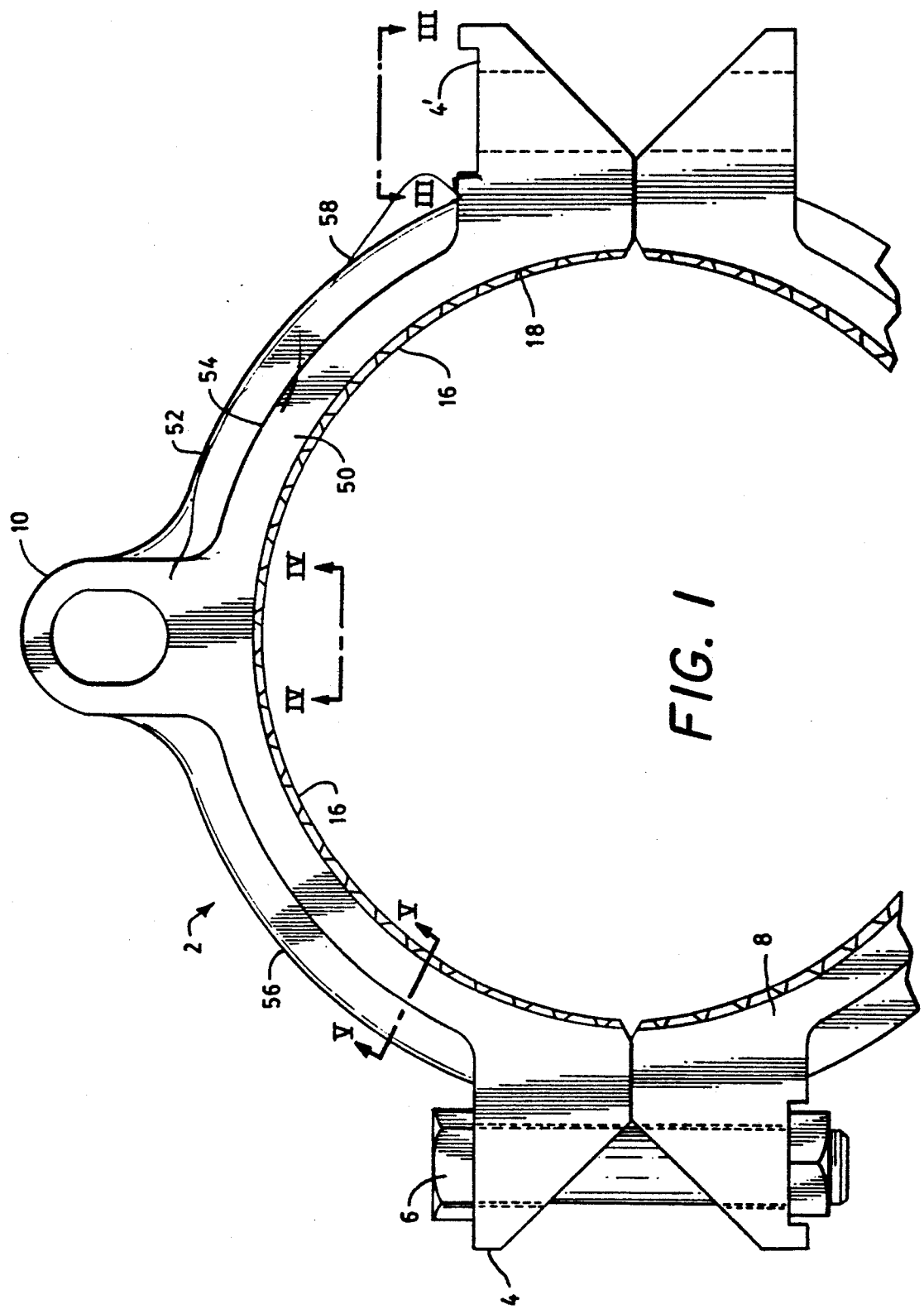
FIG. 1 is a front elevational view of one form of pipe restraining collar member illustrative of an embodiment of the invention.
Figure 2:
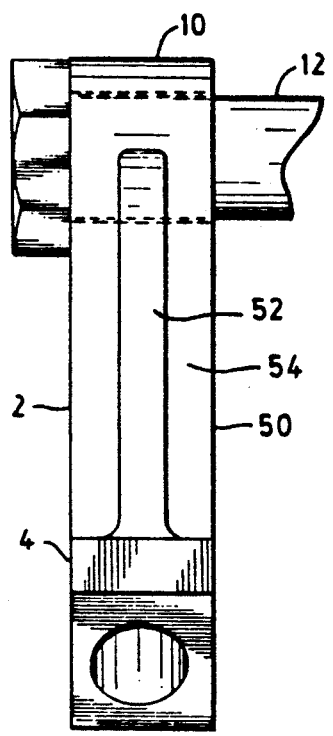
FIG. 2 is a side elevational view thereof.
Figure 3:
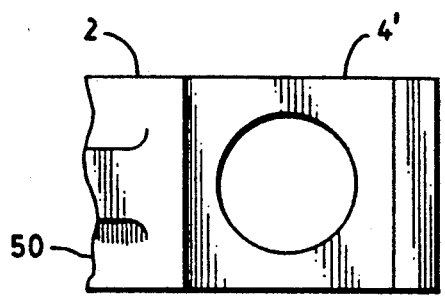
FIG. 3 is a top plan view of a portion thereof, taken along line III—III of FIG. 1.
Figure 4:
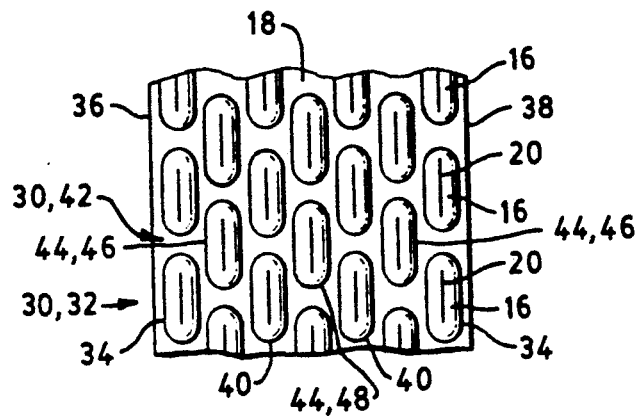
FIG. 4 is a bottom view of a portion of the member of FIG. 1, taken along line IV—IV of FIG. 1.
Figure 5:
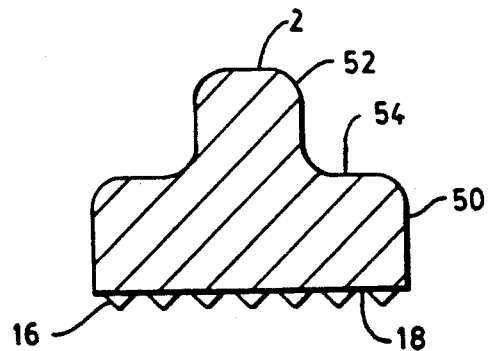
FIG. 5 is a sectional view, taken along line V—V of FIG. 1.

The collar member 2 is provided with protrusions 16 extending inwardly from an inside surface 18 of the collar member 2 and adapted to engage an external surface S of the first pipe member P1. The protrusions 16 are of solid material and are of substantially equal height, about 0.040-0.10 inch, and preferably about 0.070 inch. The protrusions 16 are elongated and slope inwardly from their base margins to define, in one embodiment, elongated central ridges 20 (FIG. 4). The protrusions 16 all have substantially equal base lengths, base widths, and central ridge lengths.

Figure 6:
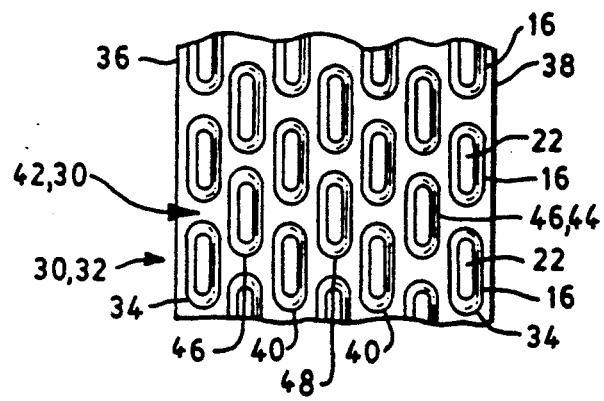
FIG. 6 is similar to FIG. 4, but illustrative of an alternative embodiment.
Figure 7:
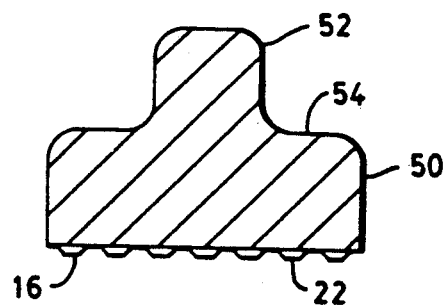
FIG. 7 is similar to FIG. 5, but illustrative of the alternative embodiment of FIG. 6.

In an alternative embodiment, instead of having the ridges 20, the protrusions 16 are provided with substantially flat surfaces 22 which engage the pipe (FIGS. 6 and 7).

Referring to FIGS. 4 and 6, it will be seen that the protrusions are arranged in staggered rows 30. In a first 32 of the staggered rows 30, end protrusions 34 are disposed adjacent front and back edges 36, 38 of the collar member. Other first row protrusions 40 are disposed in a straight line between the first row end protrusions 34 and spaced apart by equal distances, the centerline to-centerline distance being about 0.25 inch. In a second 42 of the rows 30, second row protrusions 44 include end protrusions 46 spaced inwardly from the collar member edges 36, 38 and one or more other second row protrusions 48 disposed in a straight line between the second row end protrusions 46 and spaced apart by equal distances, the centerline-to-centerline distance being about 0.25 inch. The first and second rows 32, 42 of protrusions are thus staggered and equally spaced to facilitate an evenly distributed gripping force on the pipe. The protrusions 16 are thus disposed so as to form interrupted inwardly extending lands adapted to engage the pipe intermittently circumferentially thereof.

Thus, the elongated protrusions are arranged such that they form interrupted circumferential inwardly extending lands 48 adapted to engage the exterior of the pipe member P1. Inasmuch as the lands 48 are interrupted, the strength of the pipe member is in large measure preserved. The staggered disposition of the protrusions insures that plastic caused by the protrusions to flow forwardly and rearwardly of a given protrusion, encounters other protrusions operative to limit the plastic flow. The upper ridges 20, or alternatively, the flat surfaces 22, overlap the ridges, or flat surfaces, of protrusions in adjacent rows, such that flow of plastic pipe material from a given protrusion is limited by neighboring protrusions.

The collar member 2 comprises a band portion 50 generally rectangular in cross-section (FIGS. 5 and 7), and a reinforcing rib portion 52 upstanding from an external surface 54 of the band portion centrally along the length of the band portion and generally normal to the external surface 54 of the band portion 50. Preferably, the band portion 50, the rib portion 52, the lug 10, and the flanges 4, 4' are formed integrally or fabricated with each other to form a unitary member. The rib portion 52 preferably extends from flange 4 to flange 4', a first rib portion 56 (FIG. 1) extending from the first flange 4 to the lug 10, and a second rib portion 58 extending from the second flange 4' to the lug 10. The rib portion 52 serves to reinforce the flanges 4, 4' and the lug 10, the latter of which, in service, is under stress from the tie bolts 12. The combination of the band portion 50 and the rib portion 52 provides the strength needed to insure longevity of the restrainer in service, and the resiliency needed to facilitate initial installation of the restrainer on a pipe.

The above-described restraining collar member is particularly suitable for use with non-metallic pipe. In use, the collar member 2 is slipped over the pipe member P1 and clamped to the support means 8. Inasmuch as the inside radius of the collar member, taken at the ridges 20, or alternatively, the flat surfaces 22, of the collar member, substantially equals or exceeds the outside radius of the pipe member P1, the collar member 2 easily engages the pipe member P1 without forcing. If there is interference because of tolerances in manufacture of the pipe and/or collar member, the band and rib configuration of the collar member permits a limited degree of flexure to facilitate saddling the pipe member with the collar member. As the collar member 2 is clamped to the support means 8 and upon the pipe member P1, the ridges 20, or surfaces 22, of the protrusions 16 either bite slightly into the pipe, or firmly engage the exterior of the pipe, generally equally around the collar member. The combination collar member 2 and support means 8 is connected to the collar assembly 14 by the tie bolts 12. When the pipe is subject to fluid flow therein, the pipe gradually expands while the protrusions remain stationary, whereby the pipe plastic material flows around the protrusions, deepening the bite of the protrusions into the pipe.

Figure 9:
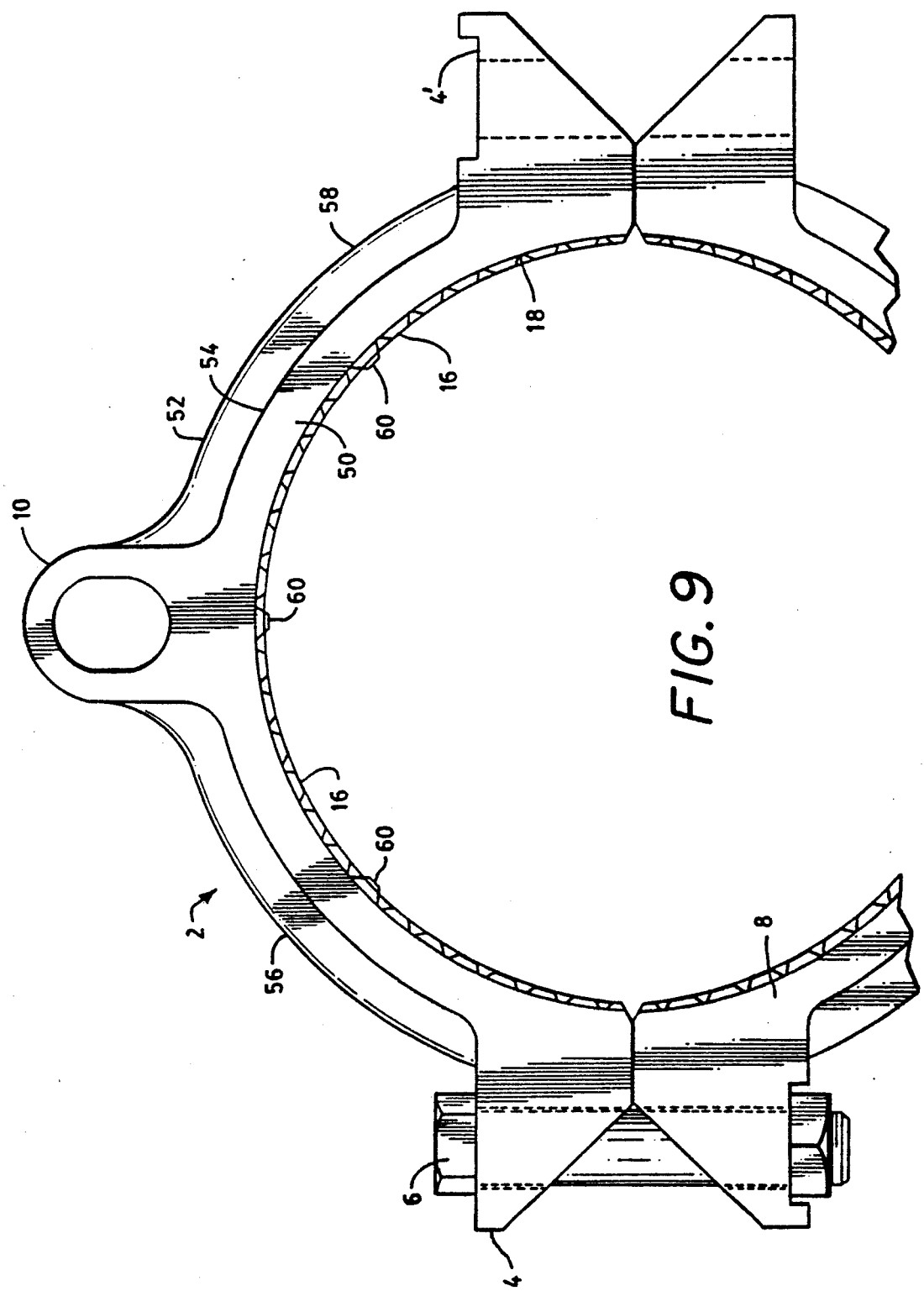
FIG. 9 is a front elevational view of a pipe restraining collar member illustrative of an alternative embodiment of the invention.

In an alternative embodiment (FIG. 9), the collar member 2 is further provided with a plurality of taller protrusions 60 which, upon installation, take an immediate bite into the pipe. As noted above, in due course, non-metallic pipe expands and engages the shorter protrusions 16, causing the protrusions 16 to bite into the pipe. Further, the alternative embodiment shown in FIG. 9, when rendered in metal, may be used with metallic pipe. Upon installation on a metallic pipe member, the taller protrusions take an immediate bite into the pipe, and, depending upon hardness of the pipe, the tolerances involved and true outside diameter of the metallic pipe, the metallic pipe and shorter protrusions 16 may come into contact and the protrusions 16 bite into the metallic pipe. In some instances, the shorter protrusions may not bite into the metallic pipe member, but in such instances, the taller protrusions 60, having accomplished firm metal-to-metal contact, serve to securely anchor the collar member to the pipe member. Thus, the alternative embodiment of collar member shown in FIG. 9, when rendered in a metallic material, finds utility in cooperation with both non-metallic and metallic pipe. In this alternative embodiment, the inside radius of the collar member, computed from the ridges 20, or surfaces 22, of the shorter protrusions, is made substantially equal to the outside radius of the pipe. However, the resiliency of the band and rib collar member construction permits installation of the collar member such that the taller protrusions 60 initially are able to engage the pipe substantially equally around the collar member.

In the alternative embodiment, the taller protrusions 60 are about 0.030 inch taller than the protrusions 16, and have a height of about 0.070–0.130 inch, and preferably about 0.10 inch. The projections 60 are of the same material but not necessarily of the same general configuration as the projections 16. As may be seen in FIG. 9, each collar member is provided with a relatively small number of the taller protrusions 60, generally about 6–10 of such protrusions. Typically, the taller protrusions 60 are distributed around the collar member. Each of the taller protrusions 60 is disposed such that each taller protrusion is proximate a number of the protrusions 16, and remote from any other taller protrusion.

It is to be understood that the present invention is by no means limited to the particular construction herein disclosed and/or shown in the drawings, but also comprises any modifications or equivalents within the scope of the claims. For example, while the drawings illustrate a collar member having an arc of 180°, such that two collar members encircle a pipe, it is known that in large pipelines, collar members having an arc of 120°, or less, often are used, requiring three, or more, such collar members to encircle the pipe.

Having thus described our invention, what we claim as new and desire to secure by Letters Patent of the United States is:

1. A pipe restraining member comprising a collar member, flange means disposed on said collar member and adapted to receive first connecting means for connecting said collar member to support means, said collar member and said support means being adapted cooperatively to substantially encircle a first pipe member, lug means disposed on said collar member and adapted to receive second connecting means for connecting said collar member to a collar assembly substantially encircling a second pipe member, and first and second protrusions extending inwardly from an inside surface of said collar member and adapted to engage an external surface of said first pipe, said protrusions having elongated bases and smaller free ends, said first protrusions being disposed such that said free ends form interrupted inwardly extending lands along the length of said inside surface, said second protrusions being taller than said first protrusions and being disposed such that each of said second protrusions is proximate only first protrusions and is remote from the nearest other second protrusion.

2. The pipe restraining member in accordance with claim 1 in which said first protrusions are configured such that said free ends each comprise an elongated central ridge.

3. The pipe restraining member in accordance with claim 1 in which said first protrusions are configured such that said free ends each comprise an elongated central flat surface.

4. The pipe restraining member in accordance with claim 1 in which each of said first protrusions has a base width, base length and free end length substantially equal to base widths, base lengths and free end lengths, respectively, of remaining of said first protrusions.

5. The pipe restraining member in accordance with claim 1 wherein an inside radius of said collar member, measured at said free ends of said lands, is at least equal to an outside radius of said external surface of said first pipe member.

6. The pipe restraining member in accordance with claim 1 wherein said interrupted lands are staggered, such that axially of the collar member, each interruption between first protrusions occurs mid-length of one of said first protrusions in a neighboring land.

7. The piper restraining member in accordance with claim 1 wherein said second protrusions are about 0.030 inch taller than said first protrusions.

8. The pipe restraining member in accordance with claim 1 wherein said first protrusions have a height of about 0.040–0.10 inch, said second protrusions have a height of about 0.070–0.130 inch and said second protrusions have a greater height than said first projections.

9. The pipe restraining member in accordance with claim 8 wherein said first protrusions have a height of about 0.070 inch, and said second protrusions have a height of about 0.10 inch.

10. The pipe restraining member in accordance with claim 1 wherein said collar member is provided with about 6–10 of said second protrusions.

11. The pipe restraining member in accordance with claim 1 wherein said collar member is provided with a first of said second protrusions at about mid-way between the ends of said collar member, a second of said second protrusions between said first of said second protrusions and a first of said ends of said collar member, and a third of said second protrusions between said first of said second protrusions and a second of said ends of said collar member.

12. The pipe restraining member in accordance with claim 1 wherein said collar member comprises a band portion, said band portion having said inside surface from which extend said protrusions, and a rib portion extending from an outside surface of said band portion centrally along the length of said band portion and generally normal to said outside surface of said band portion, said band portion and said rib portion being dimensioned so as to provide sufficient flexibility to said collar member to facilitate placement thereof on said first pipe member.

13. A pipe restraining member comprising a collar member, first and second flange means disposed on said collar member at first and second ends thereof and adapted to receive first connecting means for connecting said collar member to support means, said collar member and said support means being adapted cooperatively to substantially encircle a first pipe member, lug means disposed on said collar member and adapted to receive second connecting means for connecting said collar member to a collar assembly substantially encircling a second pipe member, said collar member comprising a band portion having an inside surface adapted to be positioned proximate an external surface of said first pipe, and an outside surface, a rib portion upstanding from said outside surface and extending along the length of said outside surface centrally thereof, and protrusions extending from said inside surface of said collar member and adapted to engage said external surface of said first pipe member, wherein said protrusions comprise first and second protrusions, said second protrusions being taller by about 0.030 inch than said first protrusions, each of said second protrusions being proximate first protrusions and remote from other second protrusions, said collar member having about 6–10 of said second protrusions.

14. The pipe restraining member in accordance with claim 13 wherein an inside radius of said collar member, measured at free ends of said first protrusions is about equal to or greater than an outside radius of said first pipe member.

* * * * *